US 8,849,238 B2

(12) United States Patent
Cepuran et al.

(10) Patent No.: US 8,849,238 B2
(45) Date of Patent: Sep. 30, 2014

(54) TELEMATICS UNIT AND MOBILE DEVICE PAIRING WITH MISSING DEVICE NOTIFICATIONS

(75) Inventors: Lawrence D. Cepuran, Northville, MI (US); Steven P. Schwinke, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 13/363,821

(22) Filed: Feb. 1, 2012

(65) Prior Publication Data

US 2013/0196612 A1     Aug. 1, 2013

(51) Int. Cl.
*H04M 11/04*     (2006.01)

(52) U.S. Cl.
USPC .................... 455/404.1; 455/569.2; 455/41.2; 455/41.3

(58) Field of Classification Search
USPC .......... 455/404.1, 421, 423–425, 426.1, 41.2, 455/554.2, 555, 569.2, 575.9
See application file for complete search history.

(56) References Cited

U.S. PATENT DOCUMENTS

| | | | |
|---|---|---|---|
| 8,521,235 B2* | 8/2013 | Nixon et al. ............... | 455/569.2 |
| 8,565,838 B2* | 10/2013 | Nicolini .................... | 455/569.2 |
| 2010/0148920 A1* | 6/2010 | Philmon et al. ............. | 340/5.2 |
| 2011/0143668 A1* | 6/2011 | Farrell et al. ................ | 455/41.2 |
| 2012/0110466 A1* | 5/2012 | Tan ............................. | 715/744 |
| 2012/0225634 A1* | 9/2012 | Gee et al. .................... | 455/404.2 |
| 2012/0252431 A1* | 10/2012 | Gee et al. .................... | 455/422.1 |
| 2012/0282908 A1* | 11/2012 | Nicolini ....................... | 455/418 |
| 2013/0099892 A1* | 4/2013 | Tucker et al. ................ | 340/5.61 |

* cited by examiner

*Primary Examiner* — Magdi Elhag
(74) *Attorney, Agent, or Firm* — Leydig, Voit & Mayer, Ltd.

(57) ABSTRACT

The described method and system provide for forgotten phone notification and vehicle theft notification. A method includes: activating a configurable device pairing program module associated with a short-range wireless unit of the telematics unit when a triggering condition is satisfied; determining, using the configurable device pairing program module and short-range wireless unit, whether the paired mobile device is within range of the short-range wireless unit; and providing, in response to a determination that the paired mobile device is not within range of the short-range wireless unit, a notification to the paired mobile device that the vehicle is being operated in the exception state that is based, at least in part, upon the paired mobile device not being detected during the determining step.

14 Claims, 4 Drawing Sheets

TELEMATICS UNIT AND MOBILE DEVICE PAIRING WITH MISSING DEVICE NOTIFICATIONS

FIELD

The present disclosure relates generally to telematics systems and more specifically to systems and methods for pairing one or more mobile devices with a telematics unit,

BACKGROUND

Telematics units within mobile vehicles provide subscribers with connectivity to a telematics service provider (TSP). The TSP provides the subscriber with an array of services ranging from emergency call handling and stolen vehicle recovery to diagnostics monitoring and turn-by-turn navigation. Telematics units are often provisioned and activated at a point of sale when a subscriber purchases a telematics-equipped vehicle. Upon activation, the telematics unit is utilized to provide a subscriber with the telematics services.

One of the available services is hands-free calling, which is facilitated by a cellular component integrated into a telematics unit (e.g., a user can purchase a set number of minutes from a TSP and have a phone number associated with the in-vehicle cellular component), or it can be facilitated by a connection to a user's mobile device (e.g., the user uses the human-machine interface (HMI) associated with the telematics unit to perform hands-free calling from a personal mobile device via a communication link between the telematics unit and the personal mobile device). The communication link between the user's mobile device and the telematics unit can be provided over a short-range wireless technology such as Bluetooth, WiFi, ZigBee, and RFID.

SUMMARY

Implementations of the present invention contemplate harnessing the communication capabilities of telematics systems to provide users with additional services such as forgotten phone notification and vehicle theft notification. In one implementation, the present invention provides a method for notifying a user of telematics services that a vehicle is being operated in an exception state relating to lack of detection of a mobile device previously paired with a telematics unit of the vehicle (paired mobile device). The method includes: activating a configurable device pairing program module associated with a short-range wireless unit of the telematics unit when a triggering condition is satisfied; determining, using the configurable device pairing program module and short-range wireless unit, whether the paired mobile device is within range of the short-range wireless unit; and providing, in response to a determination that the paired mobile device is not within range of the short-range wireless unit, a notification to the paired mobile device that the vehicle is being operated in the exception state that is based, at least in part, upon the paired mobile device not being detected during the determining step.

In a further implementation, the method is implemented in the form of computer-executable instructions stored on a tangible non-transitory computer-readable medium that is part of a vehicle telematics unit.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Conventional telematics systems in vehicles do not leverage their communication capabilities to their full potential. In general terms, implementations of the present invention contemplate harnessing these communication capabilities of telematics systems to provide users with additional services such as forgotten phone notification and vehicle theft notification. For example, when a user forgets his or her phone at an arbitrary location (such as at home or at a restaurant), a telematics-equipped vehicle notifies the user that the user does not have their phone with them. In a further implementation, if the user has his or her phone but someone else is operating the vehicle while the user is not present, a TSP call center or the telematics unit sends a communication to the user's phone notifying the user that his or her vehicle is being operated while he or she is not present.

Figure 1:
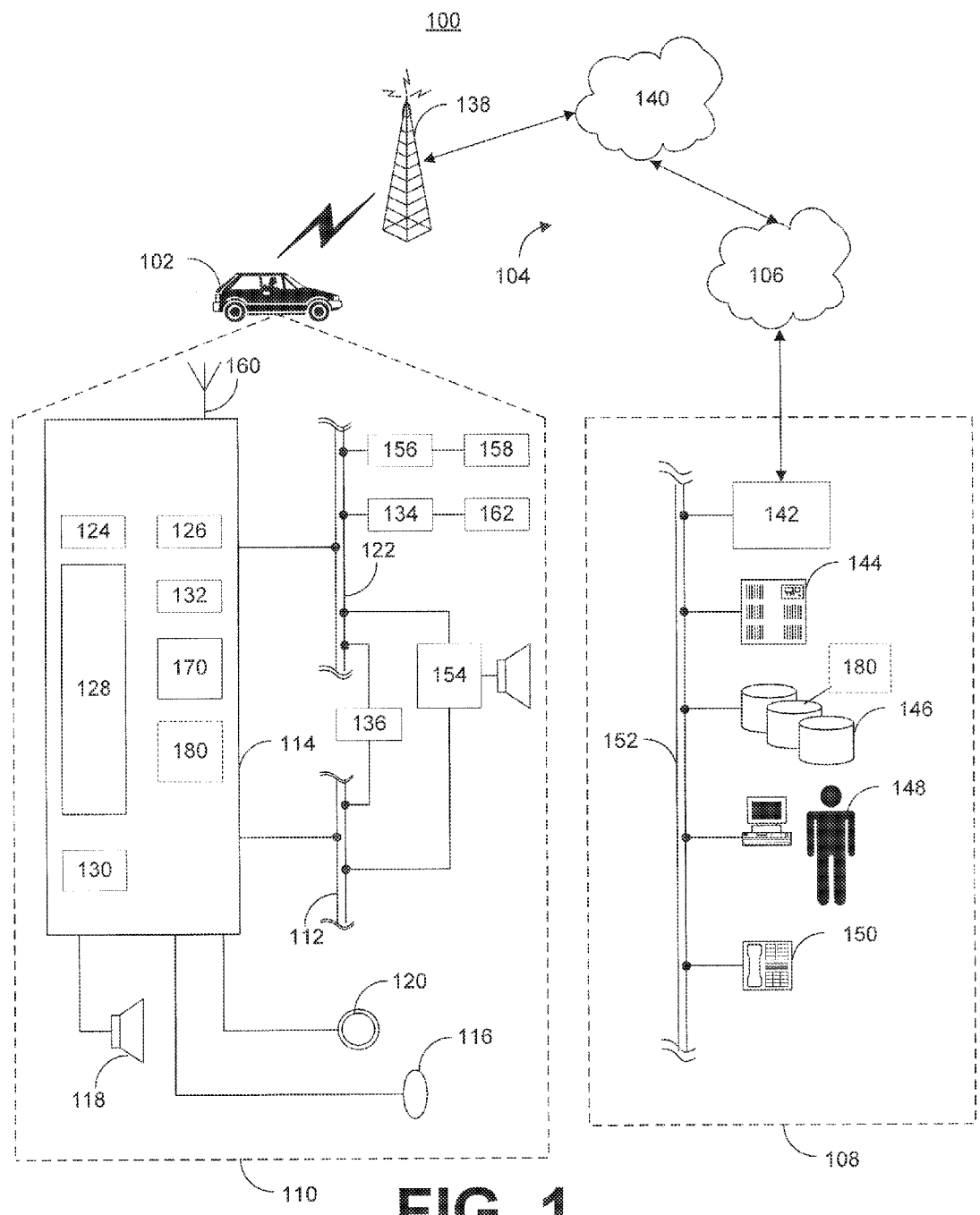
FIG. 1 is a schematic diagram of an operating environment for a mobile vehicle communication system usable in implementations of the described principles.

Before going into the details of specific exemplary implementations of the present invention, an exemplary environment suitable for various implementations is described hereinafter. It will be appreciated that the described environment is an example, and does not imply any limitation regarding the use of other environments. With reference to FIG. 1 there is shown an example of a communication system 100 that is used with the present method and system and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 is called the network access device (NAD) of the telematics unit 114. The NAD 114 further includes a short-range wireless unit 170 capable of communicating with a user's mobile device such as a cellular phone, tablet computer, PDA, or the like, over a short-range wireless protocol. For example, in one implementation, the short-range wireless unit 170 is a Bluetooth unit with an RF transceiver that communicates with a user's mobile device using Bluetooth protocol. It will be appreciated that other short-range wireless communication technologies other than Bluetooth may be used in other implementations.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle.

Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications use radio transmissions to establish a communications channel with wireless carrier system 104 so that both voice and data transmissions are sent and/or received over the communications channel. Vehicle communications are enabled via the cellular chipset/component 124 for voice communications and a wireless modem 126 for data transmission.

In order to enable successful data transmission over the communications channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech.

The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 contains a speaker system or utilizes speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center includes a remote data server.

As appreciated by those skilled in the art, various cell tower/base station/MSC arrangements are possible and could be used with wireless system 104 (also referred to as the "cellular network" herein). For example, a base station and a cell tower could be co-located at the same site or they could be remotely located, and a single base station could be coupled to various cell towers or various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

It will be appreciated by those of skill in the art that the execution of the various machine-implemented processes and steps described herein occur via the computerized execution of computer-executable instructions stored on a tangible computer-readable medium, e.g., RAM, ROM, PROM, volatile, nonvolatile, or other electronic memory mechanism. Thus, operations performed by the telematics unit, the call center, and/or a user's mobile device are carried out according to stored instructions or applications stored on a computer-readable medium in each respective entity. For example, in one implementation, the telematics unit includes a configurable device pairing program module that processes the initial pairing of a mobile device with the telematics unit and executes detection of a previously paired mobile device as further described below.

Figure 2:
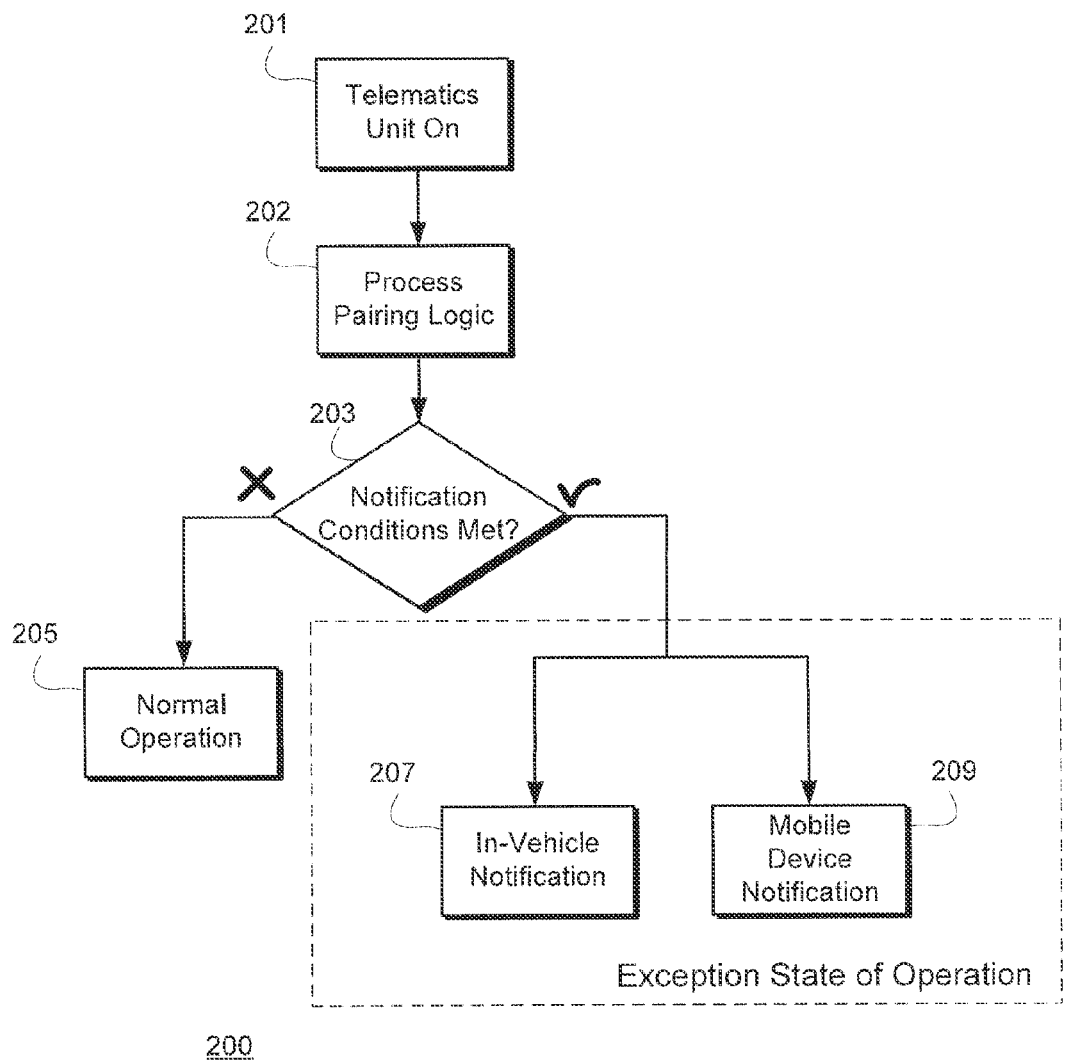
FIG. 2 is a flowchart illustrating a process for notifying a user that a paired device is missing in accordance with an implementation of the described principles.

With further reference to the exemplary system architecture of FIG. 1, an exemplary process 200 for notifying a user that a paired device is missing is depicted in FIG. 2. The process 200 presumes that the user has previously paired at least one device with a telematics unit of a vehicle.

An initial pairing occurs at any arbitrary time including, by way of example, when the user signs up for telematics services or when the user obtains a new mobile device. In one implementation, Bluetooth technology is used to perform the initial pairing, as well as subsequently determine if a paired device is present. Using Bluetooth technology, mobile devices are paired with the telematics units by exchanging secret keys, and after the mobile devices are paired with the telematics units, the telematics unit is able to uniquely identify the paired mobile device but typically does not have additional information about the mobile device (such as the phone number or name corresponding to the user of the paired mobile device). However, additional information associated with a paired mobile device can be added to the telematics unit and/or a call center by the user, for example, by communicating the information to a TSP call center or inputting the information into a website as described further below. In a further implementation, a notification list (shown in FIG. 1 as element 180) of paired devices and additional information corresponding to the paired devices is stored at the telematics unit and/or the TSP call center.

In one implementation, the initial pairing is performed by the user in the vehicle directly with the telematics unit (e.g., by prompting the telematics unit to pair a mobile device and inputting any relevant configuration parameters into the vehicle HMI). In a further implementation, the initial pairing is facilitated by a TSP call center or through other secure means to prevent an unauthorized user from pairing an unauthorized device with the telematics unit. For example, the user calls the TSP call center and indicates that the user wishes to pair a device with the telematics unit, the call center verifies the user's identity and wirelessly provides instructions to the telematics unit to search for the user's mobile device over a short-range wireless protocol, and when detected, the TSP call center pairs the user's mobile device with the telematics unit by storing the relationship at the telematics unit and/or the call center. The user can further configure the paired device in the notification list by indicating the user's preferences to the TSP call center. In another example, the user logs into a subscriber account on a website affiliated with the TSP using the user's credentials through any computing device connected to the Internet, and the user indicates that he or she wishes to pair a certain mobile device with the telematics unit and inputs the configuration parameters into the website. It will be appreciated that other secure was of pairing a mobile device to the telematics unit are possible and within the contemplated scope of the present invention; the aforementioned implementations are merely examples provided to illustrate how initial pairing of the user's mobile device with a telematics unit can be performed.

The configuration parameters include, for example, notification preferences corresponding to a paired mobile device. For example, during the initial pairing, the user indicates that the user wishes to receive a text message when the vehicle is being operated with the mobile device not being detected, or the user indicates that the user wishes to receive a voice call when the vehicle is being operated with the mobile device not being detected. In a further implementation, when multiple devices are paired with a single telematics unit, the configuration parameters can include notification preferences that indicate the conditions under which certain users are to be notified and other users need not be notified. It will be appreciated that more than one mobile device can be paired with the telematics unit. For example, certain users have multiple mobile devices that they use together or interchangeably. For those users it is advantageous to allow them to pair more than one device with the telematics unit, and further to designate in the notification list whether they wish to be notified when any paired device is not detected or only when all paired devices are not detected. In another example, a vehicle has multiple users, each of which has a mobile phone.

The configuration parameters are stored in a notification list that is stored at the call center and/or the telematics unit. The notification list, for example, includes one or more names and phone numbers as well as the configuration parameters corresponding to each of those names and phone numbers.

In one exemplary situation, a vehicle has three drivers, including two parents and their teenage child, each of which have a mobile device. The notification list can then be set up upon initial pairing to notify both of the parents' mobile devices whenever the vehicle is being operated with none of the parents' mobile devices being present. As long as one of the parents' mobile devices is present, no notifications are made to any of the mobile devices. However, if only the teenage child's mobile device is present, or none of the three drivers' mobile devices is present, the parents' mobile devices are notified. It will be appreciated that the notifications are customizable and can provide information regarding which devices are present (including whether no devices are present at all), thus allowing a parent from the exemplary situation to distinguish between a situation where the child is driving the vehicle alone or a situation where the vehicle is possibly being stolen.

It will further be appreciated that the above described exemplary situation is just an illustrative example, and other notifications schemes are contemplated by the present invention. For example, one user may be configured in the notification list such that the user is always notified of other users driving the vehicle while another user in the notification list is configured such that the another user is only notified when a subset of the other users are driving a vehicle. In another example, one user may be designated as a primary user that is always notified when the vehicle is being operated without the primary user's mobile device being present, while other users are all designated as secondary users that do not receive notifications. In yet another example, all users in the notification list receive notifications when their respective mobile devices are not present and the vehicle is being operated. Moreover, in exemplary embodiments, the notification functionality is integrated with other telematics features such as GPS to provide location information to a designated e-mail or mobile device account when certain pairing arrangements are detected (or not detected).

Turning now to the details of FIG. 2, the process 200 begins when the telematics unit is turned on at stage 201, for example, when the key is placed into the vehicle ignition and turned to the ON state. It will be appreciated that in other implementations, the process 200 begins upon some other initial condition, such as when the vehicle ignition is turned on, or when the user attempts to perform a task that requires the use of a paired mobile device.

At stages 202 and 203, the telematics unit then activates its short-range wireless unit and searches the area within the range of the short-range wireless protocol used by the telematics unit's short-range wireless unit to process pairing logic based on the configured notification list. The telematics unit determines that a paired device is detected by Checking for any mobile devices nearby, and if any are found, the telematics unit determines whether the found device was previously paired with the telematics unit. This processing further includes determining whether conditions for notification have been met even if one or more paired devices is detected.

At stage 203, if conditions for notifications have been met (e.g., no paired devices were detected or the notification list indicates notification should be made even though a certain paired device was found), the vehicle is determined to be operated in an "exception state" of operation, and the telematics unit provides an in-vehicle notification that the paired device was not found at stage 207 to notify the user that the user may have forgotten his or her mobile device. This in-vehicle notification is provided through the vehicle HMI, for example, through an audio message played over the video speakers or a text message displayed on a screen in the vehicle. The telematics unit also provides a notification at stage 209 over a wireless network to the user's mobile device—for example, by way of a text message, an e-mail message, a phone call, or other way of communicating with the user's mobile device—that indicates the vehicle is being operated without the user's mobile device being present. The in-vehicle notification and the notification to the mobile device are provided based on a notification list stored at the telematics unit. In an implementation where the notification list is stored exclusively at the TSP call center, the telematics unit transmits the results of the determination at stage 203 to the TSP call center and the call center determines the appropriate in-vehicle notifications and notifications to mobile devices that need to be made. It will be appreciated that the notifications at stages 207 and 209 may be issued concurrently or one after the other.

In a further implementation, the user is given the option to make the detection of a paired device at stage 202 a prerequisite for allowing the vehicle to be operated or driven. This option adds an extra layer of security for the vehicle, preventing it from being operated or driven by any unauthorized drivers so long as the user is in possession of his or her mobile device.

If the notification conditions are not met at stage 203 (e.g., a suitable paired mobile device designated as a primary user in the notification list is detected), the telematics unit and vehicle engage in normal operation and do not provide the above-described in-vehicle and mobile device notifications. In a further implementation, the telematics unit provides a confirmation via the vehicle HMI that a paired device, was detected and that normal operation of the vehicle will be permitted.

Figure 3:
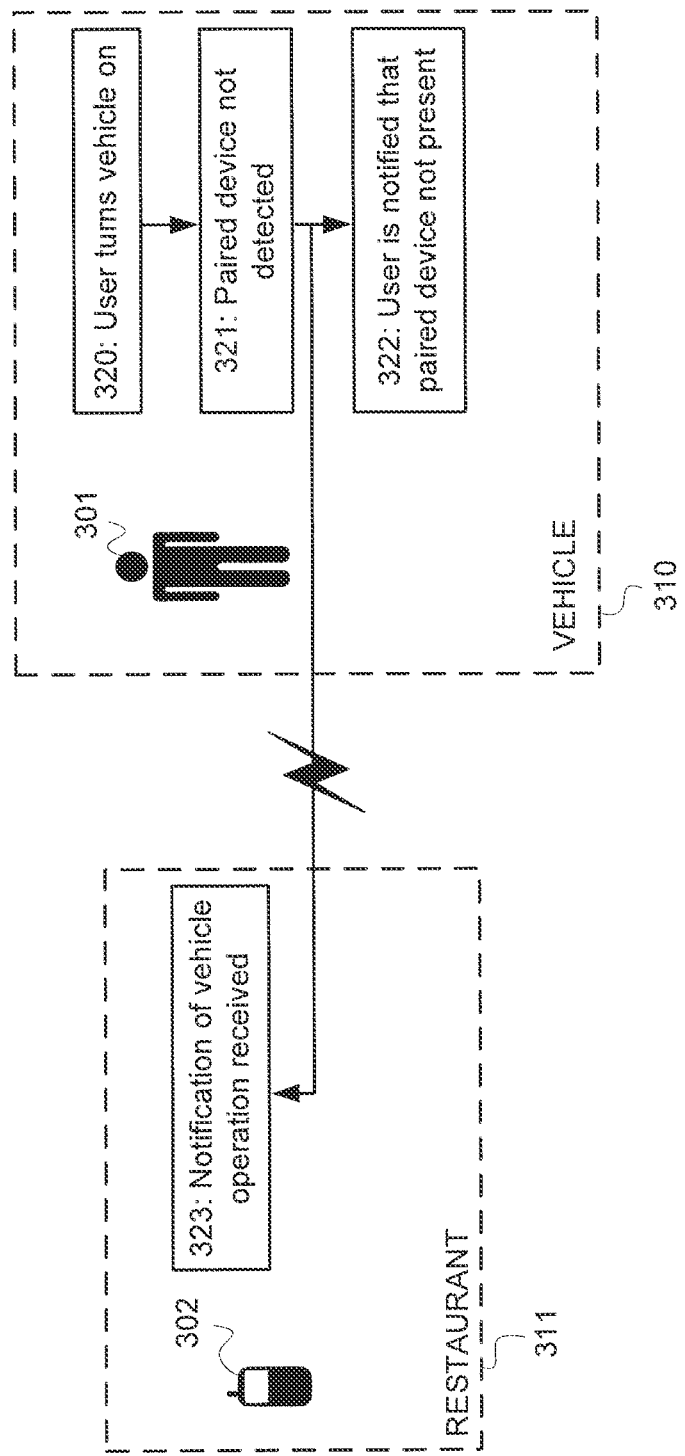
FIG. 3 is a diagram illustrating an example of forgotten phone notification in accordance with an implementation of the described principles.
Figure 4:
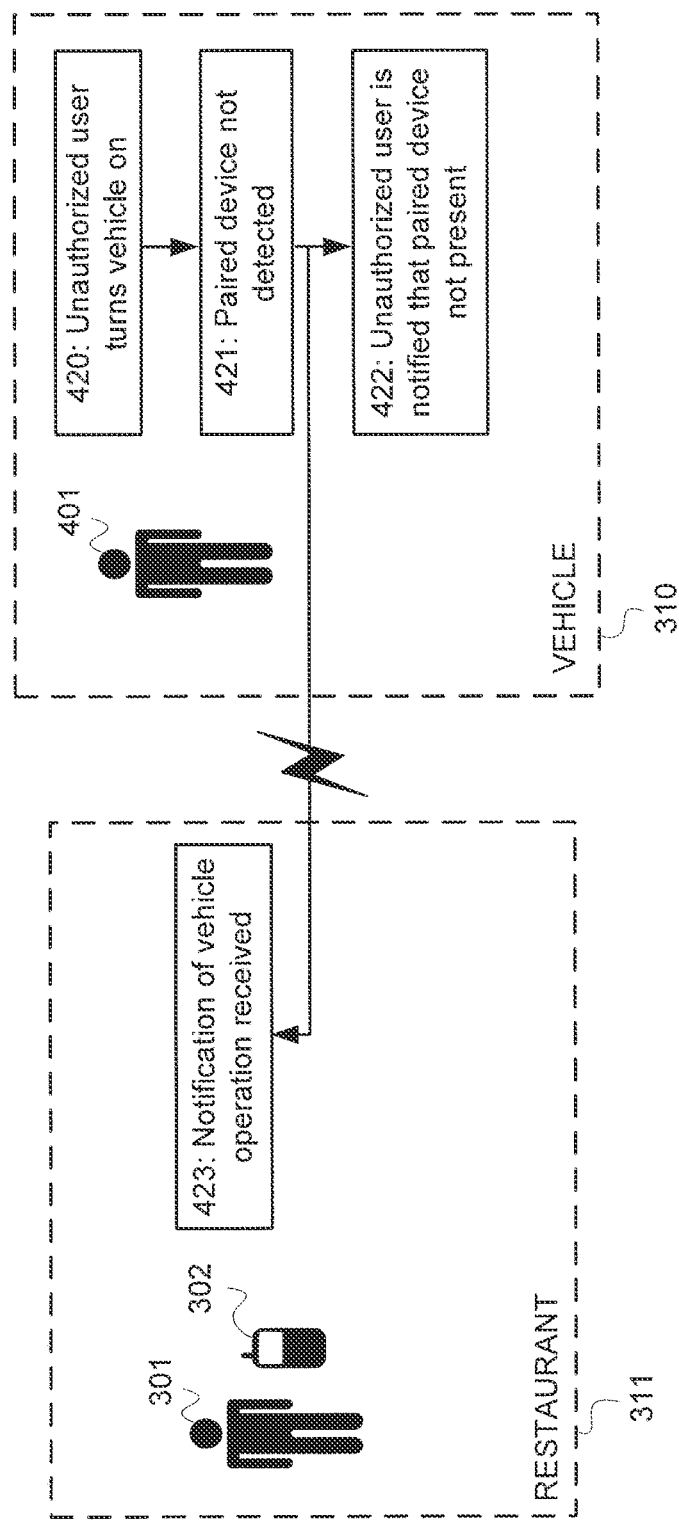
FIG. 4 is a diagram illustrating an example of vehicle theft notification in accordance with an implementation of the described principles.

FIGS. 3 and 4 are diagrams illustrating the operation of process 200 in exemplary situations. FIG. 3 is a diagram 300 illustrating a situation where a user 301 has forgotten his mobile device 302 (which was previously paired with the telematics unit of vehicle 310) at a restaurant 311. The user 301 has returned to his vehicle 310, and thus when the user turns the vehicle on at stage 320, the telematics unit determines at stage 321 that the paired mobile device 302 has not been detected. The user 301 is then notified at stage 322 that the paired device is not detected, which will prompt the user 301 to return to the restaurant 311 to retrieve his mobile device 302. It will be appreciated that a notification that the vehicle 310 is being operated without the mobile device 302 detected is also sent wirelessly to the mobile device 302 at stage 323, but in this exemplary situation this message may be disregarded by the user 301 because of the circumstances under which the message was sent. In a further implementation, the notification message sent to the mobile device 302 includes instructions for contacting and/or returning the mobile device 302 to the user 301 (and may further lock unauthorized users from using the mobile device 302), in the event that the user 301 drives off without his mobile device 302 despite the in-vehicle notification provided to the user 301 at stage 322.

FIG. 4 is a diagram 400 illustrating a situation where the user 301 is at the restaurant 311 with his mobile device 302, and an unauthorized user 401 (e.g., a car thief) is attempting to operate the user's vehicle 310. At stage 420, the unauthorized user turns the vehicle 310 on, but at stage 421 the telematics unit of the vehicle 310 determines that the paired mobile device 302 has not been detected. Thus, at stage 423, the user 301 receives a communication on his mobile device 423 indicating that the vehicle 310 is being operated. The user 301 may then decide on an appropriate course of action: for example, notifying the call center and/or the police that a theft is taking place. The unauthorized user 401 is also notified through the in-vehicle notification that the paired mobile device 302 is not detected at stage 422. In a further implementation, this in-vehicle notification includes an indication that the unauthorized use of the vehicle is being reported to the user 301, and may serve to deter an unauthorized user 401 from completing a theft of the vehicle 310.

It is thus contemplated that other implementations may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for notifying a user of telematics services that a vehicle is being operated in an exception state relating to lack of detection of a mobile device previously paired with a telematics unit of the vehicle (paired mobile device), the method comprising:
    activating a configurable device pairing program module associated with a short-range wireless unit of the telematics unit when a triggering condition is satisfied;
    determining, using the configurable device pairing program module and short-range wireless unit, whether the paired mobile device is within range of the short-range wireless unit; and
    providing a notification to the paired mobile device that the vehicle is being operated in the exception state, and providing an in-vehicle notification that the paired mobile device is not present, wherein the in-vehicle notification is provided through a human-machine interface (HMI) of the vehicle;
    wherein providing the notification to the paired mobile device and providing the in-vehicle notification through the HMI are in response to only a single detected condition, the single detected condition being a determination that the paired mobile device is not within range of the short-range wireless unit;
    wherein providing the notification to the paired mobile device further comprises:
        sending, by the telematics unit, a wireless communication to the paired mobile device, wherein the wireless communication is one of the group consisting of: a text message, an e-mail, and a call; or
        notifying, by the telematics unit, a call center that the vehicle is being operated without the paired mobile device being detected so as to cause the call center to send a wireless communication to the paired mobile device, wherein the wireless communication is one of the group consisting of: a text message, an e-mail, and a call.

2. The method of claim 1, wherein the triggering condition is satisfied when the telematics unit is turned on.

3. The method of claim 1, wherein the short-range wireless unit is a Bluetooth unit that communicates with the paired mobile device utilizing Bluetooth protocol.

4. The method of claim 1, wherein determining whether the paired mobile device is within range of the short-range wireless unit further comprises:
    scanning for any mobile device within range of the short-range wireless unit; and
    identifying a mobile device within range of the short-range wireless unit as the paired mobile device.

5. The method of claim 1, wherein providing a notification to the paired mobile device is further based on configuration parameters of a notification list.

6. The method of claim 1, wherein more than one mobile device is paired with the telematics unit.

7. A telematics unit having a short-range wireless unit and a tangible, non-transitory computer-readable medium with computer-executable instructions for notifying a user of telematics services that a vehicle is being operated in an exception state relating to lack of detection of a mobile device previously paired with a telematics unit of the vehicle (paired mobile device) stored thereon, the computer-executable instructions, when executed by a processor, causing the processor to perform the steps of:
    activating a configurable device pairing program module associated with a short-range wireless unit of the telematics unit when a triggering condition is satisfied;
    determining, using the configurable device pairing program module and short-range wireless unit, whether the paired mobile device is within range of the short-range wireless unit; and
    providing a notification to the paired mobile device that the vehicle is being operated in the exception state, and providing an in-vehicle notification that the paired mobile device is not present, wherein the in-vehicle notification is provided through a human-machine interface (HMI) of the vehicle;
    wherein providing the notification to the paired mobile device and providing the in-vehicle notification through the HMI are in response to only a single detected condition, the single detected condition being a determination that the paired mobile device is not within range of the short-range wireless unit;
    wherein providing the notification to the paired mobile device further comprises:
        sending a wireless communication to the paired mobile device, wherein the wireless communication is one of the group consisting of: a text message, an e-mail, and a call; or
        notifying a call center that the vehicle is being operated without the paired mobile device being detected so as to cause the call center to send a wireless communication to the paired mobile device, wherein the wireless communication is one of the group consisting of: a text message, an e-mail, and a call.

8. The telematics unit of claim 7, wherein the triggering condition is satisfied when the telematics unit is turned on.

9. The telematics unit of claim 7, wherein the short-range wireless unit is a Bluetooth unit that communicates with the paired mobile device utilizing Bluetooth protocol.

10. The telematics unit of claim 7, wherein the step of determining whether the paired mobile device is within range of the short-range wireless unit further comprises:

scanning for any mobile device within range of the short-range wireless unit; and identifying a mobile device within range of the short-range wireless unit as the paired mobile device.

11. The telematics unit of claim 7, wherein providing a notification to the paired mobile device is based on configuration parameters of a notification list.

12. The telematics unit of claim 7, wherein more than one mobile device is paired with the telematics unit.

13. The method of claim 1, wherein driving operation of the vehicle is disabled in response to a determination that the paired mobile device is not within range of the short-range wireless unit.

14. A method for notifying users of telematics services that a vehicle is being operated in an exception state relating to lack of detection of mobile devices previously paired with a telematics unit of the vehicle (paired mobile devices), the method comprising:

activating a configurable device pairing program module associated with a short-range wireless unit of the telematics unit when a triggering condition is satisfied;

determining, using the configurable device pairing program module and short-range wireless unit, whether a first paired mobile device and whether a second paired mobile device are within range of the short-range wireless unit, wherein both the first and second paired mobile devices are classified as primary mobile devices; and providing a notification to both the first and second paired mobile devices that the vehicle is being operated in the exception state, and providing an in-vehicle notification that the paired mobile device is not present, wherein the in-vehicle notification is provided through a human-machine interface (HMI) of the vehicle;

wherein providing the notifications to the first and second paired mobile devices and providing the in-vehicle notification through the HMI are in response to only a single detected condition, the single detected condition being a determination that both the first and second mobile devices are not within range of the short-range wireless unit;

wherein providing the notification to the first and second paired mobile devices further comprises:

sending wireless communications to the first and second paired mobile devices, wherein the wireless communications are each one of the group consisting of: a text message, an e-mail, and a call; or notifying a call center that the vehicle is being operated without the paired mobile device being detected so as to cause the call center to send wireless communications to the first and second paired mobile devices, wherein the wireless communications are each one of the group consisting of: a text message, an e-mail, and a call.

\* \* \* \* \*